United States Patent
Tian et al.

(10) Patent No.: US 10,053,230 B2
(45) Date of Patent: Aug. 21, 2018

(54) MAGNETIC LEVITATION OBSTACLE AVOIDANCE DEVICE AND MAGNETIC LEVITATION HOLDER

(71) Applicant: Haoxiang Electric Energy (Kunshan) Co., Ltd., Kunshan, Jiangsu (CN)

(72) Inventors: Yu Tian, Jiangsu (CN); Wenyan Jiang, Jiangsu (CN)

(73) Assignee: Haoxiang Electric Energy (Kunshan) Co., Ltd., Kunshan, Jiangsu (CN)

( * ) Notice: Subject to any disclaimer, the term of this patent is extended or adjusted under 35 U.S.C. 154(b) by 0 days.

(21) Appl. No.: 15/687,253

(22) Filed: Aug. 25, 2017

(65) Prior Publication Data
US 2017/0349298 A1  Dec. 7, 2017

(30) Foreign Application Priority Data

Dec. 26, 2016  (CN) .......................... 2016 1 1221539
Dec. 26, 2016  (CN) ..................... 2016 2 1439778 U

(51) Int. Cl.

| | |
|---|---|
| *B64D 47/08* | (2006.01) |
| *H04N 5/247* | (2006.01) |
| *G03B 15/00* | (2006.01) |
| *G03B 17/56* | (2006.01) |
| *B64C 39/02* | (2006.01) |
| *H04N 5/225* | (2006.01) |
| *H04N 5/232* | (2006.01) |
| *G06K 9/00* | (2006.01) |

(52) U.S. Cl.
CPC ............ *B64D 47/08* (2013.01); *B64C 39/024* (2013.01); *G03B 15/006* (2013.01); *G03B 17/561* (2013.01); *H04N 5/2253* (2013.01); *H04N 5/2328* (2013.01); *H04N 5/247* (2013.01); *G06K 9/0063* (2013.01)

(58) Field of Classification Search
None
See application file for complete search history.

(56) References Cited

U.S. PATENT DOCUMENTS

| | | | | |
|---|---|---|---|---|
| 2010/0264756 A1* | 10/2010 | Lee | ....................... | F04B 35/045 |
| | | | | 310/38 |
| 2014/0209751 A1* | 7/2014 | Stagmer | ................... | B64G 1/28 |
| | | | | 244/165 |
| 2017/0040861 A1* | 2/2017 | Ho | ........................... | H02K 1/12 |
| 2017/0207680 A1* | 7/2017 | Power | .................. | H02K 7/1823 |
| 2017/0210220 A1* | 7/2017 | Wang | ................... | B60K 7/0007 |
| 2017/0246365 A1* | 8/2017 | Bourque | ............. | A61M 1/1036 |
| 2017/0338725 A1* | 11/2017 | Stevens | .................. | H02K 15/03 |
| 2017/0349298 A1* | 12/2017 | Tian | ....................... | B64D 47/08 |

* cited by examiner

*Primary Examiner* — William B Perkey

(57) ABSTRACT

A magnetic levitation obstacle avoidance device and a magnetic levitation holder are provided, wherein the magnetic levitation obstacle avoidance device includes: a magnetic levitation component and an obstacle avoidance module; wherein the magnetic levitation component comprises a driving component, an inner stator and an outer rotor; wherein the obstacle avoidance module is mounted on the outer rotor; the driving component drives the outer rotor according to attitude changes of the obstacle avoidance module, so as to change a magnetic force between the outer rotor and the inner stator; the obstacle avoidance module is adjusted to a target attitude by magnetic levitation rotation of the outer rotor. The magnetic levitation obstacle avoidance device and the magnetic levitation holder are self-adaptive in attitude adjustment, and are more stable.

18 Claims, 2 Drawing Sheets

MAGNETIC LEVITATION OBSTACLE AVOIDANCE DEVICE AND MAGNETIC LEVITATION HOLDER

CROSS REFERENCE OF RELATED APPLICATION

The present invention claims priority under 35 U.S.C. 119(a-d) to CN 201611221539.5, filed Dec. 26, 2016; and CN 201621439778.3, filed Dec. 26, 2016.

BACKGROUND OF THE PRESENT INVENTION

Field of Invention

The present invention relates to obstacle avoidance technologies, and more particularly to a magnetic levitation obstacle avoidance device and a magnetic levitation holder.

Description of Related Arts

UAV (unmanned aerial vehicle) visual navigation system is capable of real-time modeling, autonomous navigation and positioning in a complex and unknown flight environment. Various sensors such as a visible light camera, an infrared camera and a laser range finder are installed on a UAV platform, so as to collect multidimensional flight environment information, and real-time reconstruct a three-dimensional model of the unknown flight environment by data exchange and collaborative computing frame between a built-in processor and ground stations, in such a manner that independent positioning, autonomous visual obstacle avoidance, tracking and landing are achieved without any external positioning devices (such as GPS). Therefore, the UAV visual navigation system can be widely used in unknown flight environment reconnaissance with complex communication environment, surveillance and detection, search and rescue, etc.

Conventional UAV visual obstacle avoidance systems are mostly one-directional, such as those of products such as DJI® Phantom 4 and YUNEEC® Typhoon H.

These avoidance schemes are achieved by mounting an optical sensor to an airframe of a UAV, which causes two disadvantages: 1. UAV airframe will fiercely vibrate, which will lead to high-frequency vibration of optical image information captured by the sensor; as a result, high resolution obstacle avoidance camera cannot be used, resulting in difficulty to distinguish small obstacles, such as electric cables; 2. airframe posture will change during flight, which will cause that a lens of an obstacle avoidance module cannot be always aligned with a plane of a flight direction, and cannot achieve obstacle avoidance during flight. A conventional solution to such problems is limiting attitude change angles of the UAV during movement, namely limiting a flight speed of the UAV, resulting in bed flight experience, and obstacle avoidance under airframe vibration is still impossible.

SUMMARY OF THE PRESENT INVENTION

An object of the present invention is to provide a magnetic levitation obstacle avoidance device and a magnetic levitation holder, which is self-adaptive in attitude adjustment, and is more stable.

Accordingly, in order to accomplish the above objects, the present invention provides a magnetic levitation obstacle avoidance device, comprising: a magnetic levitation component and an obstacle avoidance module; wherein the magnetic levitation component comprises a driving component, an inner stator and an outer rotor; wherein the obstacle avoidance module is mounted on the outer rotor; the driving component drives the outer rotor according to attitude changes of the obstacle avoidance module, so as to change a magnetic force between the outer rotor and the inner stator; the obstacle avoidance module is adjusted to a target attitude by magnetic levitation rotation of the outer rotor.

According to an embodiment of the present invention, the obstacle avoidance module comprises obstacle avoidance cameras outwardly arranged along a circumference of the outer rotor, and a visual field generated by all the obstacle avoidance cameras covers a whole circumference range, so as to achieve all-directional obstacle avoidance.

According to the embodiment of the present invention, the obstacle avoidance cameras comprise four pairs of binocular cameras or six pairs of the binocular cameras, which are evenly arranged alone the circumference of the outer rotor.

According to the embodiment of the present invention, the driving component comprises: a permanent magnet mounted on an internal side of the outer rotor; a coil winding mounted on an external side of the inner stator; and a control module; wherein the control module controls electrifying of the coil winding according to the attitude changes of the obstacle avoidance module for changing the magnetic force, in such a manner that the permanent magnet correspondingly rotates under a magnetic levitation force for regaining a force balance, so as to adjust the obstacle avoidance module to the target attitude.

According to the embodiment of the present invention, a first end of the inner stator is movably connected to the outer rotor, and a second end of the inner stator extends out of the outer rotor.

According to the embodiment of the present invention, the outer rotor has a window for an extending portion of the inner stator, a caliber of the window is larger than the extending portion of the inner stator.

According to the embodiment of the present invention, the first end of the inner stator is connected to the outer rotor through a universal joint.

According to the embodiment of the present invention, the second end of the inner stator extends out of the outer rotor through a connecting rod, and is connected to an unmanned mobile device.

According to the embodiment of the present invention, the unmanned mobile device is an unmanned aerial vehicle.

According to the embodiment of the present invention, the outer rotor is hollow and spherical, the permanent magnet matches the outer rotor and is arranged along a circumference of the internal side thereof; a portion of the inner stator is corresponding to the coil winding and forms a spherical core, and the coil winding matches the spherical core and is arranged along a circumference of an external side of the spherical core; the permanent magnet is arranged opposite to the coil winding with a constant interval therebetween.

According to the embodiment of the present invention, the magnetic levitation obstacle avoidance device further comprises an attitude sensor which is mounted relatively to the obstacle avoidance module, for sensing the attitude changes of the obstacle avoidance module and sending an attitude signal to the driving component.

The present invention also provides a magnetic levitation holder, comprising: a driving component, an inner stator and an outer rotor; wherein the driving component drives the outer rotor, so as to change a magnetic force between the outer rotor and the inner stator; the outer rotor is adjusted to a target attitude by magnetic levitation rotation of the outer rotor.

According to the embodiment of the present invention, the driving component comprises: a permanent magnet mounted on an internal side of the outer rotor; a coil winding mounted on an external side of the inner stator; and a control module; wherein the control module controls electrifying of the coil winding according to the attitude changes of the outer rotor for changing the magnetic force, in such a manner that the permanent magnet correspondingly rotates under a magnetic levitation force for adjusting the outer rotor to the target attitude.

According to the embodiment of the present invention, a first end of the inner stator is movably connected to the outer rotor, and a second end of the inner stator extends out of the outer rotor.

According to the embodiment of the present invention, the outer rotor has a window for an extending portion of the inner stator, a caliber of the window is larger than the extending portion of the inner stator.

According to the embodiment of the present invention, the first end of the inner stator is connected to the outer rotor through a universal joint.

According to the embodiment of the present invention, the second end of the inner stator extends out of the outer rotor through a connecting rod, and is connected to an unmanned mobile device.

According to the embodiment of the present invention, the unmanned mobile device is an unmanned aerial vehicle.

According to the embodiment of the present invention, the outer rotor is hollow and spherical, the permanent magnet matches the outer rotor and is arranged along a circumference of the internal side thereof; a portion of the inner stator is corresponding to the coil winding and forms a spherical core, and the coil winding matches the spherical core and is arranged along a circumference of an external side of the spherical core; the permanent magnet is arranged opposite to the coil winding with a constant interval therebetween.

According to the embodiment of the present invention, the magnetic levitation holder further comprises an attitude sensor which is mounted relatively to the outer rotor, for sensing the attitude changes of the outer rotor and sending an attitude signal to the driving component.

According to the embodiment of the present invention, the magnetic levitation holder further comprises a camera arranged on the outer rotor.

With the foregoing technical solutions, the present invention has the following advantages over the prior art:

Depending on the attitude changes of the obstacle avoidance module, different magnetic levitation forces are generated in the magnetic levitation component, which are balanced by adjusting a positional relationship between the inner stator and the outer rotor, so as to maintain the target attitude of the obstacle avoidance module on the outer rotor, thereby achieving attitude self-adaptive adjustment of the obstacle avoidance module, in such a manner that attitudes of the obstacle avoidance module are stable during use. That is to say, the obstacle avoidance module is stably maintained towards a desired detection direction regardless of movements of the unmanned mobile device. Images captured by the obstacle avoidance module are more stable, so high resolution optical lens can be used for detecting small obstacles, in such a manner that obstacle avoidance is more effective, and action of the unmanned mobile device is no longer restricted.

Attitude adjustment is controlled by the magnetic levitation forces, and since the magnetic levitation forces can be precisely controlled, outer rotor response for adjusting movement thereof by force balance is very quick, which is basically synchronous with movement of the unmanned mobile device. Therefore, attitude adjustment of the obstacle avoidance module is more precise and faster.

ELEMENT REFERENCE

11—inner stator, 12—outer rotor, 13—coil winding, 14—permanent magnet, 15—connecting rod, 2—obstacle avoidance module, 3—universal joint, 4—installation portion.

DETAILED DESCRIPTION OF THE PREFERRED EMBODIMENT

These and other objectives, features, and advantages of the present invention will become apparent from the following detailed description, the accompanying drawings, and the appended claims.

Features of the present invention will be fully and effectively illustrated. Its embodiment will be shown and described for the purposes of illustrating the functional and structural principles of the present invention and is subject to change without departure from such principles. Therefore, this invention includes all modifications encompassed within the spirit and scope of the following embodiment.

Figure 1:
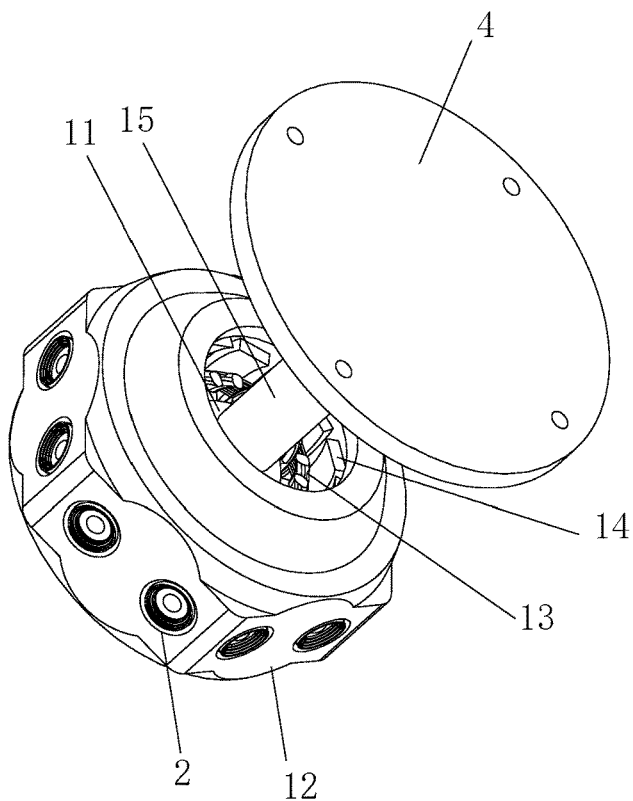
FIG. 1 is a perspective view of a magnetic levitation obstacle avoidance device according to an embodiment of the present invention.
Figure 2:
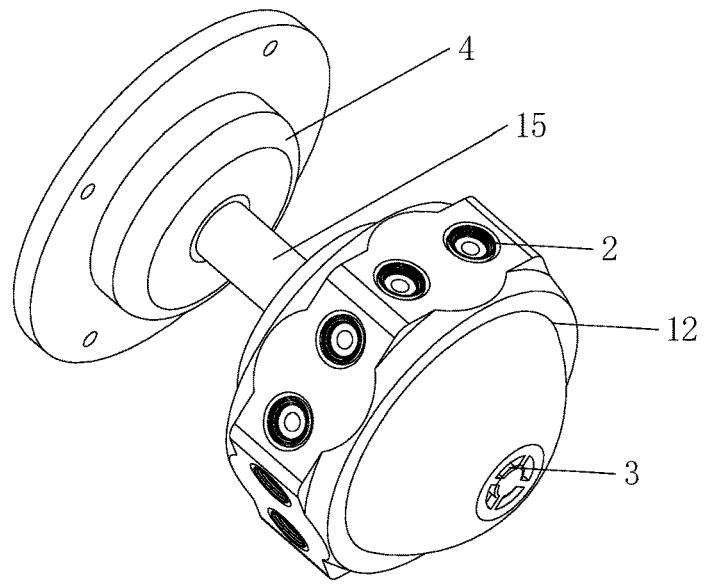
FIG. 2 is another perspective view of the magnetic levitation obstacle avoidance device according to the embodiment of the present invention.
Figure 3:
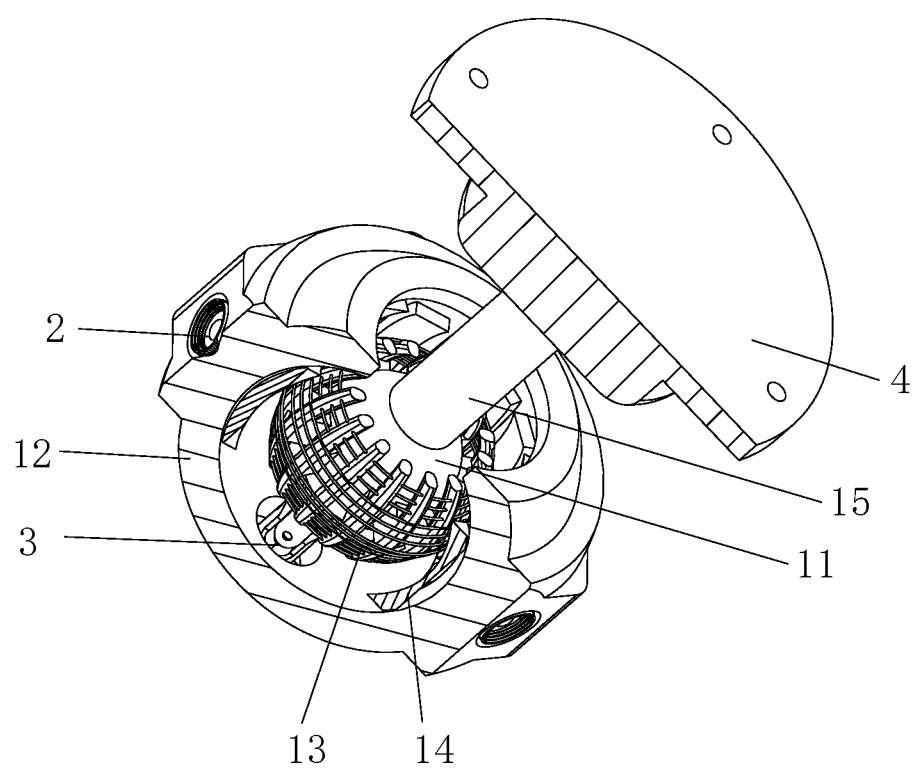
FIG. 3 is a sectional view of the magnetic levitation obstacle avoidance device according to the embodiment of the present invention.

Referring to FIGS. 1-3 of the drawings, a magnetic levitation obstacle avoidance device according to an embodiment of the present invention is illustrated, comprising: a magnetic levitation component and an obstacle avoidance module 2; wherein the magnetic levitation component comprises a driving component, an inner stator 11 and an outer rotor 12; wherein the obstacle avoidance module is mounted on the outer rotor 12.

The obstacle avoidance module 2 is used for detecting obstacles around an unmanned mobile device. The obstacle avoidance module 2 may adopt various obstacle avoidance sensors such as an infrared sensor, a laser ranging sensor and an ultrasonic distance sensor, preferably an optical sensor. The magnetic levitation obstacle avoidance device is able to maintain an attitude and a direction of an optical lens.

In an embodiment, the obstacle avoidance module is mounted on the outer rotor 12, and then mounted on the unmanned mobile device through the inner stator 11. The unmanned mobile device may be, for example, a UAV (unmanned aerial vehicles), so as to achieve obstacle avoidance of the whole UAV. Compared to the prior art which directly mounts an obstacle avoidance module on a UAV airframe, the obstacle avoidance module 2 adjusts the attitude in a plane of a flight direction by a magnetic levitation force regardless of vibration or attitude changes of the airframe, so as to detect small obstacles, for achieving obstacle avoidance during UAV flight without restricting a attitude change angle or a flight speed of the UAV, leading to a better flight experience. It will be understood that the unmanned mobile device is not limited to UAV, and may be, for example, a robot or the like.

The driving component drives the outer rotor 12 according to attitude changes of the obstacle avoidance module 2, so as to change a magnetic force between the outer rotor 12 and the inner stator 11; the obstacle avoidance module 2 is adjusted to a target attitude by magnetic levitation rotation of the outer rotor 12. Attitude changes of the obstacle avoidance module 2 are relative to the target attitude. When the attitude of the unmanned mobile device changes, the magnetic levitation obstacle avoidance thereon will follow, and the attitude of the obstacle avoidance module 2 will change. When the attitude changes of the obstacle avoidance module 2 are detected, then the driving component controls the outer rotor 12 to move relative to the inner stator 11, so as to switch to the target attitude.

Depending on the attitude changes of the obstacle avoidance module 2, different magnetic levitation forces are generated in the magnetic levitation component, which are balanced by adjusting a positional relationship between the inner stator 11 and the outer rotor 12, so as to maintain the target attitude of the obstacle avoidance module 2 on the outer rotor 12, thereby achieving attitude self-adaptive adjustment of the obstacle avoidance module 2, in such a manner that attitudes of the obstacle avoidance module 2 are stable during use. That is to say, the obstacle avoidance module 2 is stably maintained towards a desired detection direction regardless of movements of the unmanned mobile device. Images captured by the obstacle avoidance module 2 are more stable, so high resolution optical lens can be used for detecting small obstacles, in such a manner that obstacle avoidance is more effective, and action of the unmanned mobile device is no longer restricted.

According to the embodiment of the present invention, the obstacle avoidance module 2 comprises obstacle avoidance cameras outwardly arranged along a circumference of the outer rotor 12, and a visual field generated by all the obstacle avoidance cameras covers a whole circumference range, so as to achieve all-directional obstacle avoidance. Preferably, the obstacle avoidance cameras comprise four pairs of binocular cameras or six pairs of the binocular cameras, which are evenly arranged alone the circumference of the outer rotor. Referring to FIGS. 1-3, the obstacle avoidance cameras comprise six pairs of the binocular cameras, a portion on the outer rotor 12 for installing the obstacle avoidance cameras are regular hexagonal prisms, and each of the six pairs are arranged on one side face of the regular hexagonal prisms.

Conventional obstacle avoidance module can detect only one direction, usually a front environment. If surrounding environments are desired, a detecting portion must be rotated, which is more complex and is easy to cause unstable interference, and cannot detecting environments at all directions at the same time. According to the embodiment of the present invention, the binocular cameras are provided on the circumference, so there is no need to rotate a detecting portion, and the surrounding environments can be synchronously detected at any time without moving the binocular cameras, so as to achieve synchronous all-directional obstacle detection. The binocular cameras used are similar to human eyes, in such a manner that images captured contains depth information, enabling stereoscopic imaging, so as to distinguish the obstacles more clearly. Distances of the obstacles can be determined by parallax between the binocular cameras for precise obstacle avoidance, which overcomes problems of the conventional obstacle avoidance module.

According to the embodiment of the present invention, the driving component comprises: a permanent magnet 14, a coil winding 13 and a control module (not shown). The permanent magnet 14 is mounted on an internal side of the outer rotor 12, and a coil winding 13 is mounted on an external side of the inner stator 11. When being electrified, the coil winding 13 will affect the permanent magnet 14, so as to change the magnetic levitation force. A Hall element may be used for detecting magnetic field direction and change for keeping a balance therebetween. The control module controls electrifying of the coil winding 13 according to the attitude changes of the obstacle avoidance module 2 for changing the magnetic force. The change of the magnetic force breaks the balance, so the permanent magnet 14 correspondingly rotates under the magnetic levitation force for regaining the balance, so as to adjust the obstacle avoidance module 2 to the target attitude.

Attitude adjustment is controlled by the magnetic levitation forces, and since the magnetic levitation forces can be precisely controlled, outer rotor response for adjusting movement thereof by the force balance is very quick, which is basically synchronous with movement of the unmanned mobile device. Therefore, attitude adjustment of the obstacle avoidance module 2 is more precise and faster.

According to the embodiment of the present invention, a first end of the inner stator 11 is movably connected to the outer rotor 12, and a second end of the inner stator 11 extends out of the outer rotor 12, so as to be connected to the unmanned mobile device or the like. A connecting rod 15 may be provided on the second end of the inner stator which extends out of the outer rotor through the connecting rod 15. An installation portion 4 may be provided on the connecting rod 15, which is connected to the unmanned mobile device.

The outer rotor 12 has a window for an extending portion of the inner stator 11, and a caliber of the window is larger than the extending portion (the connecting rod 15) of the inner stator 11, in such a manner that rotation of the outer rotor 12 is not limited by the inner stator 11. The first end of the inner stator 11 is connected to the outer rotor 12 through a universal joint 3, and relative free rotation in multi-directions is available between the inner stator 11 and the outer rotor 12, which enables connection therebetween as well as adjustment of the inner stator 11.

According to the embodiment of the present invention, the outer rotor 12 is hollow and spherical, the permanent magnet 14 matches the outer rotor 12 and is arranged along a circumference of the internal side thereof; a portion of the inner stator 11 is corresponding to the coil winding 13 and forms a spherical core, and the coil winding 13 matches the spherical core and is arranged along a circumference of an external side of the spherical core; the permanent magnet 14 is arranged opposite to the coil winding 13 with a constant interval therebetween.

Referring to FIG. 3, the outer rotor 12 is hollow and spherical, and the internal surface thereof is a spherical surface. The permanent magnets 14 are attached to the internal side of the outer rotor 12 with intervals between the permanent magnets 14, and polarities of the permanent magnets 14 will be changed according to electrifying of the coil winding 13. The portion of the inner stator 11 for installing the coil winding 13 is the spherical core, and the coil winding 13 is able to be connected to the spherical core through connecting branches, and a shape of the coil winding 13 is also a spherical surface. The permanent magnet 14 is arranged opposite to the coil winding 13 with the constant interval therebetween.

Spherical parts ensure that the outer rotor 12 and the inner stator 11 will not get rid of a relative restriction effect therebetween caused by the magnetic levitation force, even if the outer rotor 12 and the inner stator 11 relatively rotate in multi-directions, thereby maintain stable attitude adjustment of the obstacle avoidance module 2 on the outer rotor 12, wherein the attitude is still able to be smoothly adjusted if the UAV performs large mobility.

According to the embodiment of the present invention, the magnetic levitation obstacle avoidance device further comprises an attitude sensor (not shown) which is mounted relatively to the obstacle avoidance module 2, for example, on the outer rotor 12, for sensing the attitude changes of the obstacle avoidance module 2 and sending an attitude signal to the driving component. The driving component of the control module controls electrifying of the coil winding 13 after receiving the attitude signal for changing the magnetic force. so as to adjust the obstacle avoidance module 2 to the target attitude.

The present invention also provides a magnetic levitation holder, comprising: a driving component, an inner stator and an outer rotor; wherein the driving component drives the outer rotor, so as to change a magnetic force between the outer rotor and the inner stator; the outer rotor is adjusted to a target attitude by magnetic levitation rotation of the outer rotor.

According to the embodiment of the present invention, the driving component comprises: a permanent magnet mounted on an internal side of the outer rotor; a coil winding mounted on an external side of the inner stator; and a control module; wherein the control module controls electrifying of the coil winding according to the attitude changes of the outer rotor for changing the magnetic force, in such a manner that the permanent magnet correspondingly rotates under a magnetic levitation force for adjusting the outer rotor to the target attitude.

According to the embodiment of the present invention, a first end of the inner stator is movably connected to the outer rotor, and a second end of the inner stator extends out of the outer rotor.

According to the embodiment of the present invention, the outer rotor has a window for an extending portion of the inner stator, a caliber of the window is larger than the extending portion of the inner stator.

According to the embodiment of the present invention, the first end of the inner stator is connected to the outer rotor through a universal joint.

According to the embodiment of the present invention, the second end of the inner stator extends out of the outer rotor through a connecting rod, and is connected to an unmanned mobile device.

According to the embodiment of the present invention, the unmanned mobile device is an unmanned aerial vehicle.

According to the embodiment of the present invention, the outer rotor is hollow and spherical, the permanent magnet matches the outer rotor and is arranged along a circumference of the internal side thereof; a portion of the inner stator is corresponding to the coil winding and forms a spherical core, and the coil winding matches the spherical core and is arranged along a circumference of an external side of the spherical core; the permanent magnet is arranged opposite to the coil winding with a constant interval therebetween.

According to the embodiment of the present invention, the magnetic levitation holder further comprises an attitude sensor which is mounted relatively to the outer rotor, for sensing the attitude changes of the outer rotor and sending an attitude signal to the driving component.

According to the embodiment of the present invention, the magnetic levitation holder further comprises a camera arranged on the outer rotor.

Specific features of the magnetic levitation holder of the present invention are similar to the foregoing embodiment of the magnetic levitation obstacle avoidance device, except for that other parts instead of the obstacle avoidance module may be provided on the magnetic levitation holder, i.e. the camera, or the obstacle avoidance module and the camera at the same time.

It will thus be seen that the objects of the present invention have been fully and effectively accomplished. One skilled in the art will understand that the embodiment of the present invention as shown in the drawings and described above is exemplary only and not intended to be limiting. The present invention includes all modifications encompassed within the spirit and scope of the following claims.

What is claimed is:

1. An magnetic levitation obstacle avoidance device, comprising: a magnetic levitation component and an obstacle avoidance module; wherein the magnetic levitation component comprises a driving component, an inner stator and an outer rotor; wherein the obstacle avoidance module is mounted on the outer rotor; the driving component drives the outer rotor according to attitude changes of the obstacle avoidance module, so as to change a magnetic force between the outer rotor and the inner stator; the obstacle avoidance module is adjusted to a target attitude by magnetic levitation rotation of the outer rotor;

wherein the obstacle avoidance module comprises obstacle avoidance cameras outwardly arranged along a circumference of the outer rotor, and a visual field generated by all the obstacle avoidance cameras covers a whole circumference range, so as to achieve all-directional obstacle avoidance.

2. The magnetic levitation obstacle avoidance device, as recited in claim 1, wherein the obstacle avoidance cameras comprise four pairs of binocular cameras or six pairs of the binocular cameras, which are evenly arranged alone the circumference of the outer rotor.

3. The magnetic levitation obstacle avoidance device, as recited in claim 1, wherein the driving component comprises: a permanent magnet mounted on an internal side of the outer rotor; a coil winding mounted on an external side of the inner stator; and a control module; wherein the control module controls electrifying of the coil winding according to the attitude changes of the obstacle avoidance module for changing the magnetic force, in such a manner that the permanent magnet correspondingly rotates under a magnetic levitation force for regaining a force balance, so as to adjust the obstacle avoidance module to the target attitude.

4. The magnetic levitation obstacle avoidance device, as recited in claim 1, wherein a first end of the inner stator is movably connected to the outer rotor, and a second end of the inner stator extends out of the outer rotor.

5. The magnetic levitation obstacle avoidance device, as recited in claim 4, wherein the outer rotor has a window for an extending portion of the inner stator, a caliber of the window is larger than the extending portion of the inner stator.

6. The magnetic levitation obstacle avoidance device, as recited in claim 4, wherein the first end of the inner stator is connected to the outer rotor through a universal joint.

7. The magnetic levitation obstacle avoidance device, as recited in claim 4, wherein the second end of the inner stator extends out of the outer rotor through a connecting rod, and is connected to an unmanned mobile device.

8. The magnetic levitation obstacle avoidance device, as recited in claim 7, wherein the unmanned mobile device is an unmanned aerial vehicle.

9. The magnetic levitation obstacle avoidance device, as recited in claim 3, wherein the outer rotor is hollow and spherical, the permanent magnet matches the outer rotor and is arranged along a circumference of the internal side thereof; a portion of the inner stator is corresponding to the coil winding and forms a spherical core, and the coil winding matches the spherical core and is arranged along a circumference of an external side of the spherical core; the permanent magnet is arranged opposite to the coil winding with a constant interval therebetween.

10. The magnetic levitation obstacle avoidance device, as recited in claim 1, further comprising an attitude sensor which is mounted relatively to the obstacle avoidance module, for sensing the attitude changes of the obstacle avoidance module and sending an attitude signal to the driving component.

11. A magnetic levitation holder, comprising: a driving component, an inner stator and an outer rotor; wherein the driving component drives the outer rotor, so as to change a magnetic force between the outer rotor and the inner stator; the outer rotor is adjusted to a target attitude by magnetic levitation rotation of the outer rotor;
wherein the driving component comprises: a permanent magnet mounted on an internal side of the outer rotor; a coil winding mounted on an external side of the inner stator; and a control module; wherein the control module controls electrifying of the coil winding according to the attitude changes of the outer rotor for changing the magnetic force, in such a manner that the permanent magnet correspondingly rotates under a magnetic levitation force for adjusting the outer rotor to the target attitude;
wherein a first end of the inner stator is movably connected to the outer rotor, and a second end of the inner stator extends out of the outer rotor.

12. The magnetic levitation holder, as recited in claim 11, wherein the outer rotor has a window for an extending portion of the inner stator, a caliber of the window is larger than the extending portion of the inner stator.

13. The magnetic levitation holder, as recited in claim 11, wherein the first end of the inner stator is connected to the outer rotor through a universal joint.

14. The magnetic levitation holder, as recited in claim 11, wherein a second end of the inner stator extends out of the outer rotor through a connecting rod, and is connected to an unmanned mobile device.

15. The magnetic levitation holder, as recited in claim 14, wherein the unmanned mobile device is an unmanned aerial vehicle.

16. The magnetic levitation holder, as recited in claim 11, wherein the outer rotor is hollow and spherical, the permanent magnet matches the outer rotor and is arranged along a circumference of the internal side thereof; a portion of the inner stator is corresponding to the coil winding and forms a spherical core, and the coil winding matches the spherical core and is arranged along a circumference of an external side of the spherical core; the permanent magnet is arranged opposite to the coil winding with a constant interval therebetween.

17. The magnetic levitation holder, as recited in claim 11, further comprising an attitude sensor which is mounted relatively to the outer rotor, for sensing the attitude changes of the outer rotor and sending an attitude signal to the driving component.

18. The magnetic levitation holder, as recited in claim 11, further comprising a camera arranged on the outer rotor.

* * * * *